United States Patent [19]

Fujio

[11] 4,286,421
[45] Sep. 1, 1981

[54] METHOD AND MACHINE FOR FITTING A SLEEVE SEAL OF A COLLAPSED FORM OVER A CONTAINER

[75] Inventor: Masaaki Fujio, Suita, Japan

[73] Assignee: Fuji Seal Industry Co., Ltd., Osaka, Japan

[21] Appl. No.: 108,643

[22] Filed: Dec. 31, 1979

[30] Foreign Application Priority Data

Jan. 18, 1979 [JP] Japan .................................. 54-3363

[51] Int. Cl.³ ...................... B65B 13/00; B65B 61/00
[52] U.S. Cl. ..................................... 53/399; 53/441; 53/556; 53/585; 53/292
[58] Field of Search ................. 53/399, 441, 291, 292, 53/295, 556, 885; 156/86, 423, DIG. 14, 419, 139.3

[56] References Cited

U.S. PATENT DOCUMENTS

| 2,068,107 | 1/1937 | Nygard | 53/291 |
|---|---|---|---|
| 2,103,302 | 12/1937 | Strout | 53/292 |
| 2,654,520 | 10/1953 | Allen | 53/292 |
| 2,732,115 | 1/1956 | Allen | 53/292 |
| 2,835,088 | 5/1958 | Eddison | 53/291 X |
| 4,188,249 | 2/1980 | Fujio | 53/585 |

FOREIGN PATENT DOCUMENTS 2358254 2/1978 France ....................... 156/86

Primary Examiner—John Sipos
Attorney, Agent, or Firm—Michael A. Painter

[57] ABSTRACT

A method and machine for fitting a sleeve seal of a collapsed form over a container, wherein the sleeve seal supplied is opened halfway by suction cups disposed to a base plate, and then are opened fully by separating the distance between opening members inserted therein, which are mounted movably up and down to the base plate, until the sleeve seal is somewhat tensioned, wherein the sleeve seal is formed in the cylindrical form just above a container to be fitted by closing the distance between the opening members while the sleeve seal is held by the suction cups, wherein the container is inserted into the sleeve seal opened by a lift supporting the container, wherein the opening members are pulled out of the sleeve seal, and wherein the container fitted in the sleeve seal is transferred to a next step.

4 Claims, 10 Drawing Figures

FIG. 5
FIG. 6
FIG. 7
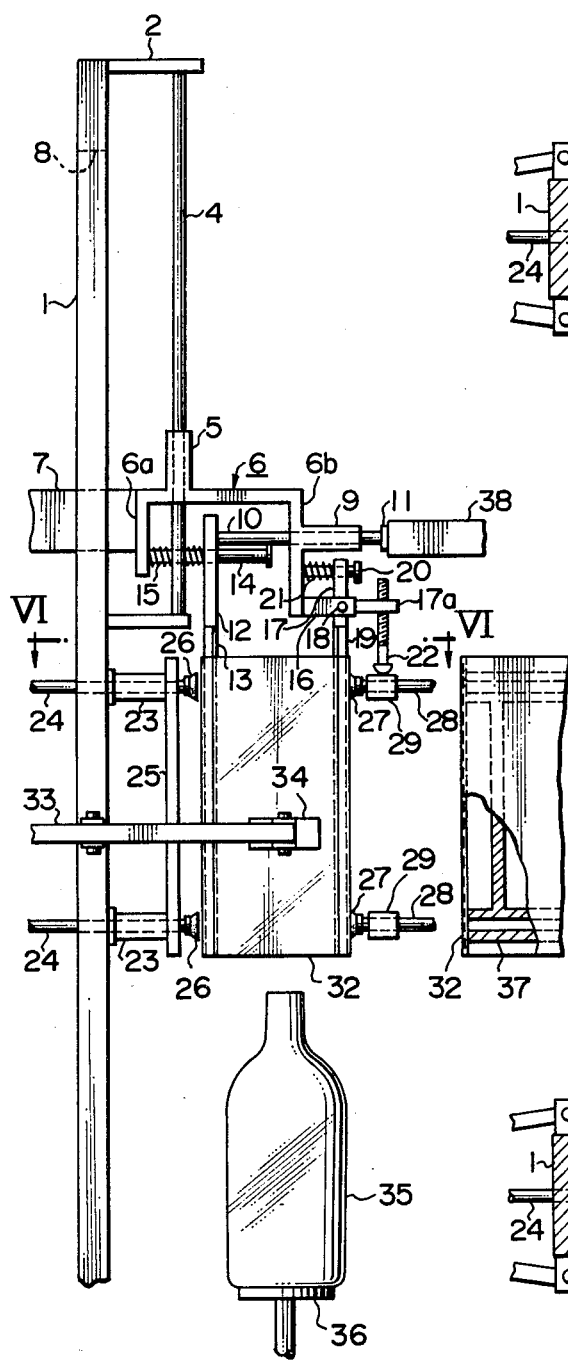
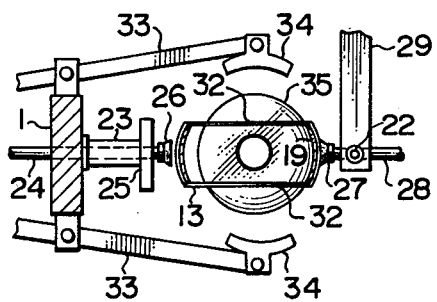
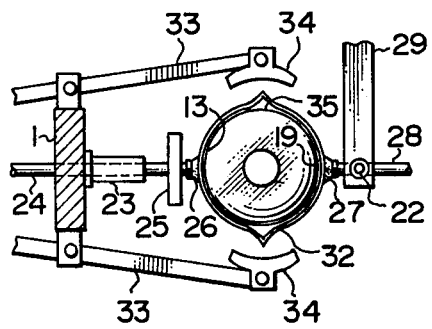

METHOD AND MACHINE FOR FITTING A SLEEVE SEAL OF A COLLAPSED FORM OVER A CONTAINER

BACKGROUND OF THE INVENTION

This invention relates to a method and machine for fitting a sleeve seal of a collapsed form over a container, and more particularly relates to a method and machine for fitting automatically a cylindrical film tube of a collapsed form, with its two sides touching one another, flat like a piece of ribbon, over a container.

When a sleeve seal, which is usually a tube of heat-shrinkable film, is supplied in a collapsed form, with its two sides touching one another, like a flat sheet or piece of ribbon, it is quite difficult to open it up so that it can be fitted over a container and heat-shrunk thereonto. The difficulty is accentuated if the process is to be performed quickly, and a large number of objects must be wrapped sequentially at high speed. Further, the two sides of the collapsed sleeve seal may rather tend to stick to one another, especially if the material is soft and flexible, or is electrified somewhat, or has been stored on a roll for a long time before use.

In a conventional method, such a sleeve seal has been opened by suction cups. However, in this case, only the central part of the tube can be opened up, and the edge of the flattened seal cannot be satisfactorily stretched so as to open them up. Thus the size of the sleeve seal must be considerably larger than the container, over which it is to be fitted, and this may well mean that a tight seal cannot be attained, since the amount of shrinkage available from the film while preserving its desirable characteristics is limited.

SUMMARY OF THE INVENTION

It is an object of the present invention to provide a method and machine for fitting a sleeve seal of a collapsed form over a container free from the abovementioned defects, which is quick and reliable.

According to the present invention there is provided a method for fitting a sleeve seal of a collapsed form over a container, comprising supplying a sleeve seal of a collapsed form to be received by suction cups, while the suction of the suction cups is functioned, opening the sleeve seal halfway by the suction cups; inserting opening members into the half-opened sleeve seal, opening the sleeve seal fully by separating the distance between the opening members until the sleeve seal is somewhat tensioned, forming the sleeve seal in the cylindrical form so as to be arranged lengthways with a container to be fitted on by closing the distance between the opening members, while the sleeve seal is held by the suction cups, inserting the container into the sleeve seal full-opened, pulling the opening members out of the sleeve seal fitted on the container, while it is properly held, and transferring the container fitted in the sleeve seal to a next step.

According to the present invention there is provided also a machine for fitting a sleeve seal of a collapsed form over a container, comprising a base plate, a sleeve seal supply means arranged in front of the base plate, which holds a sleeve seal of a collapsed form and is movable to and away from the base plate, front and rear suction holders facing each other, for holding the sleeve seal, which are disposed to the base plate, and the rear one of which is movable front and rear directions and receives the sleeve seal from the sleeve seal supply means, front and rear opening members which are mounted movably up and down to the base plate, the distance between the opening members being variable, and a lift for moving up and down a container to be fitted into the sleeve seal full-opened, wherein, when the sleeve seal is opened halfway, the opening members are inserted into the sleeve seal, and then the sleeve seal is opened fully by separating the distance between the opening members.

BRIEF DESCRIPTION OF THE DRAWINGS

The present invention will become more closely understood from the following description of a preferred embodiment with reference to the accompanying drawings, in which:

FIG. 5 is a side view of the machine of FIG. 1, wherein the sleeve seal is opened fully;

FIG. 6 is a transverse cross-section, taken along the line VI—VI in FIG. 5;

FIG. 7 is a transverse cross-section of the machine of FIG. 1, wherein the sleeve seal is fully opened in a cylindrical form just above a container;

DESCRIPTION OF A PREFERRED EMBODIMENT

Figure 1:
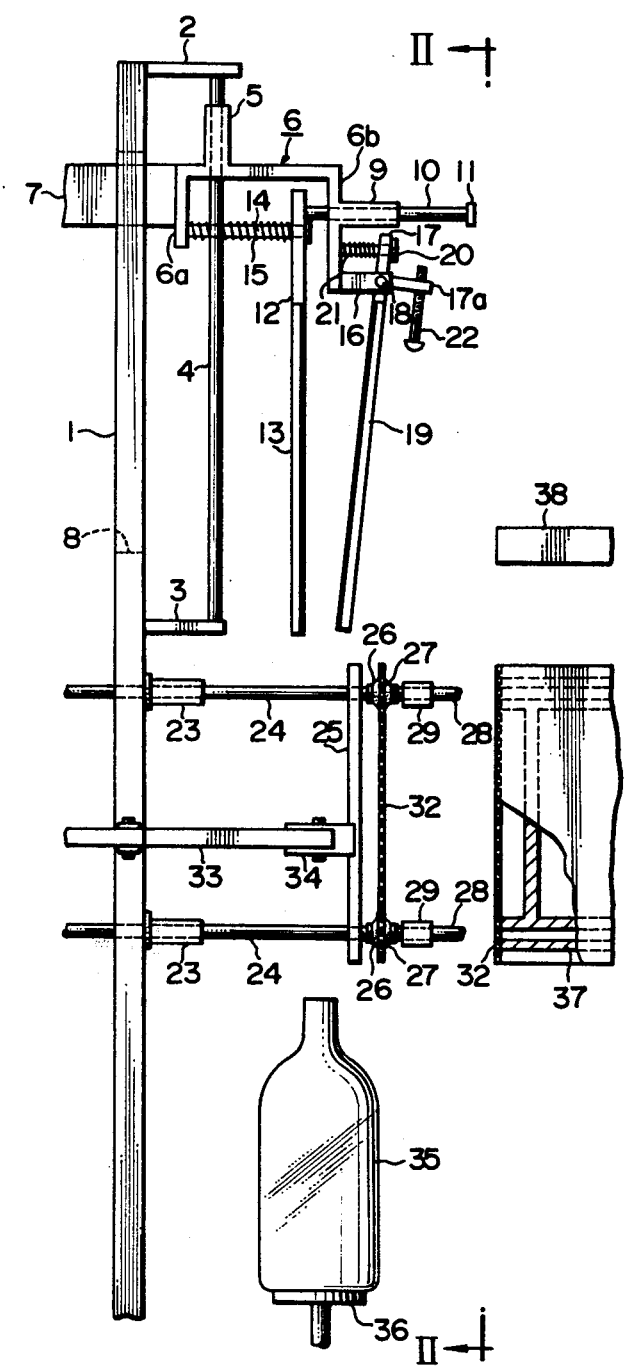
FIG. 1 is a side view of a machine according to the present invention, wherein a sleeve seal of a collapsed form is supplied.

Referring now to the drawings, wherein the similar numerals indicate the similar parts, there is shown a machine for fitting a sleeve seal of a collapsed form over a container according to the present invention.

A vertical base plate 1 is provided with a pair of brackets 2 and 3 at its top end and middle portion, which extend forwards, i.e. the right hand side direction in FIG. 1. A pair of vertical guide rods 4 are mounted between the two brackets 2 and 3 in their front side portions.

A movable platform 6 having a slide member 5 in its top and rear and front lower projections 6a and 6b which project downwards, is mounted movably up and down to the guide rods 4 through the slide member 5. The platform 6 is moved by a movable plate 7 which is movable up and down and crosses through a longitudinal slot 8 formed in the base plate 1.

From the front lower projection 6b projects frontward a guide block 9 having a horizontal holes through which a pair of movable rods 10 are inserted. To the front ends of the movable rods 10 are attached a push plate 11 and to their rear ends is mounted a vertical plate 12. From the bottom of the vertical plate 12 vertically extends downwards a rear opening member 13 of which the side ends are curved forwards to form an arc-shaped cross section. A horizontal rod 14 extends frontward from the rear lower projection 6a through the vertical plate 12 and has a stopper in its free end. A coil spring 15 is arranged onto the horizontal rod 14 and biases the vertical plate 12 frontward. Thus, the rear opening member 13 is moved rearward against the coil spring 15 by pushing the push plate 11 rearward.

A pair of support bars 16 project frontward from the both sides of the bottom of the front lower projection 6b. Between the support bars 16 is pivotally mounted a pivot plate 17 by a pivot pin 18. From the bottom of the pivot plate 17 extends downwards a front opening member 19 of which the side ends are curved rearward to form an arc-shaped cross-section. The front opening member 19 has substantially the same length as the rear opening member 13.

Between the guide block 9 and the support bars 16 a support pin 20 having a stopper in its free end projects horizontal from the front lower projection 6b through the pivot plate 17. A coil spring 21 is fitted on the support pin between the front lower projection 6b and the pivot plate 17, and biases the top portion of the pivot plate 17 frontward in its inclined position. Hence, the front opening member 19 is normally inclined somewhat rearward.

A pivot plate 17 is provided a front projection 17a which projects frontward therefrom, and in the free end of the front projection 17a is arranged an adjusting screw 22 extending parallel with the pivot plate 17.

Below the lower bracket 3 a pair of support cylinders 23 are mounted to the base plate 1 at a certain height interval along a vertical line, and each cylinder 23 has a horizontal hole through which a rear suction pipe 24 is movably inserted. The two rear suction pipes 24 are coupled by a link plate 25 at their front end portions. The front end of each rear suction pipe 24 is attached a rear suction cup 26 and the rear end of the same is led to a sucking means (not shown).

A pair of front suction cups 27 facing to the rear suction cups 26 are attached to rear ends of front suction pipes 28. The rear end portions of the front suction pipes 28 are connected to one ends of pivot bars 29, and the other ends of the same are connected to the suction means. The other ends of the pivot bars 28 are mounted to pivot shafts 30 which are pivotally mounted to the base plate 1 via support bars 31. Thus, the front suction cups 27 can be pivoted outwards around the pivot shafts 30.

A sleeve seal 32 which is usually a heat-shrinkable film tube in a collapsed form, with its two sides touching one another, like a piece of ribbon, is supplied, as described later.

Between the two rear suction pipes 24 a pair of pivot arms 33 pivotally mounted to the base plate 1 in its both sides, and are adapted to be pivoted insides in a horizontal plane. A holding member 34 is fixed to the free end of each pivot arm 33. Below the rear suction pipes 24 a bottle 35 is placed on a lift means 36 which moves the bottle 35 up and down.

A sleeve seal supply drum 37 is arranged in front of the rear suction cups 26 and is adapted to move rearward between the front suction cups 27 when they are pivoted outwards, and to rotate around a vertical axis (not shown) with the sleeve seal on its surface.

A pushing bar 38 is so arranged above the drum 37 that, when the platform 6 is lowered to the lowermost position, the pushing bar 38 may push the push plate 11, thereby moving the rear opening member 13 rearward, as hereinafter described.

The operation of the machine mentioned above will be described.

Figure 2:
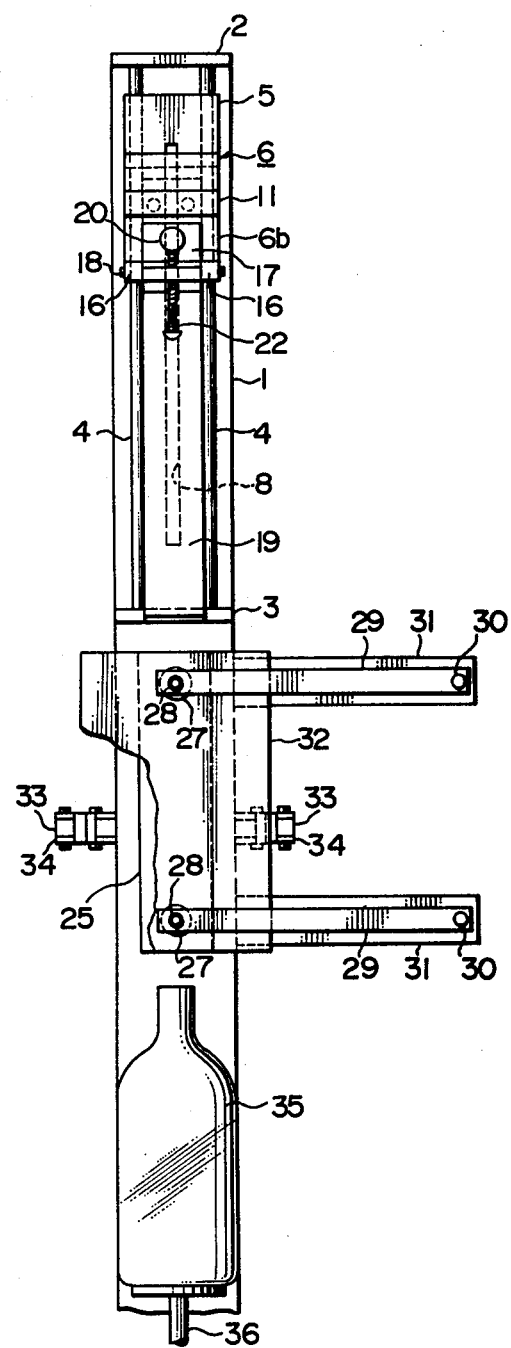
FIG. 2 is a longitudinal front view, taken along the line II—II in FIG. 1.

In FIGS. 1 and 2, first, the collapsed sleeve seal 32 supplied from the sleeve seal supply drum 37 is held by the rear and the front suction cups 26 and 27, while the suction means is functioned, so that the sleeve seal 32 and the front edge of the bottle 35 may be aligned along a vertical line, and the rear opening member 13 may be positioned frontside of the rear edge of the bottle 35.

Figure 3:
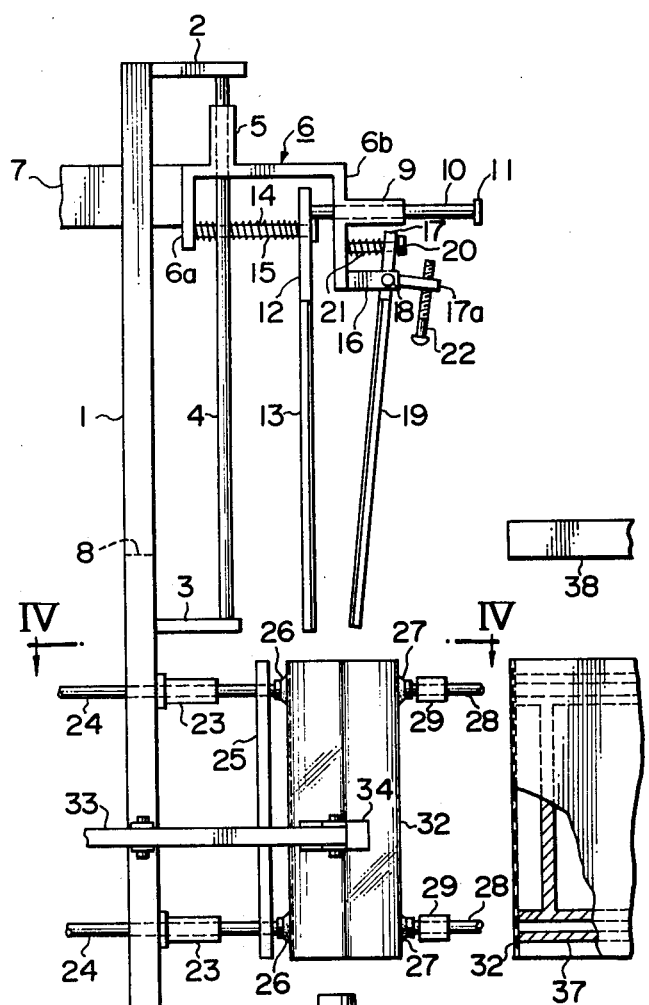
FIG. 3 is a side view of the machine of FIG. 1, wherein the sleeve seal is opened halfway.
Figure 4:
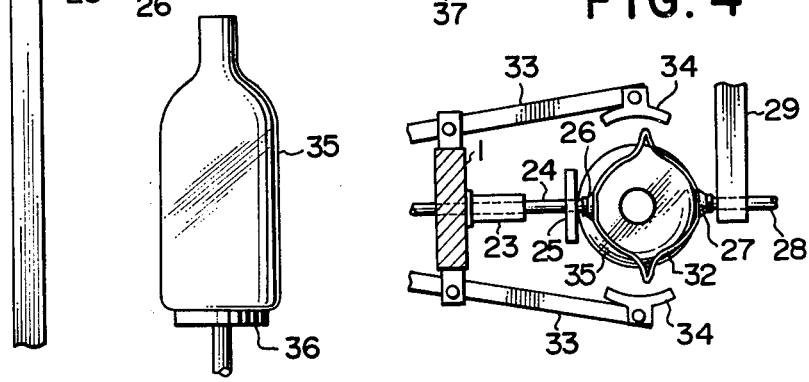
FIG. 4 is a transverse cross-section, taken along the line IV—IV in FIG. 3.

Then, the rear suction cups 26 are moved backward, while the suction means is working, in order to open the sleeve seal 32 halfway, as shown in FIGS. 3 and 4. When the platform 6 is lowered to the lowermost position, the rear and the front opening members 13 and 19 are inserted into the sleeve seal 32 half-opened, and the lower end of the adjusting screw 22 is contacted and pushed up by the upper pivot bar 29, thereby pivoting the pivot plate 17 and the front opening member 19 counterclockwise against the coil spring 21 in the vertical position or in parallel with the rear opening member 13.

While the rear suction cups 26 are moved backward and the suction of the suction cups are stopped, the pushing bar 38 is moved rearward so as to push the push plate 11 and then the vertical plate 12 with the rear opening member 13 against the coil spring 15 until the sleeve seal 32 is tensioned somewhat, thereby extending fully the sleeve seal 32, as shown in FIGS. 5 and 6.

Then, the rear suction cups 26 moved to contact with the sleeve seal 32 and the suction of the suction cups is switched on. In the same time, the pushing bar 38 is moved frontward a short distance so that the rear opening member 13 may be positioned just above the rear edge of the bottle 35, and thereby the sleeve seal 32 full-opened which held by the suction cups 26 and 27 is formed in a cylindrical form right above the bottle 35, as shown in FIG. 7.

Figure 8:
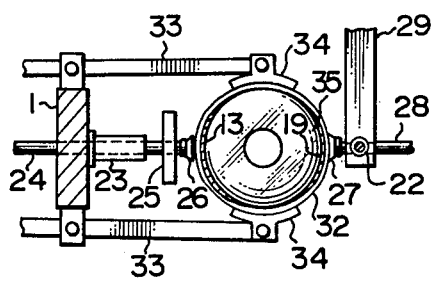
FIG. 8 is a transverse cross-section of the machine of FIG. 1, wherein the container is fitted into the sleeve seal full-opened.

The bottle 35 is then moved upwards into the sleeve seal 32 full-opened by the lift means 36. In this occasion, the pushing bar 38 is moved frontward to the normal position. The pivot arms 33 with the holding members 34 are pivoted to the bottle 35 fitted in the sleeve seal 32 in order to hold the bottle 35, as shown in FIG. 8.

Figure 9:
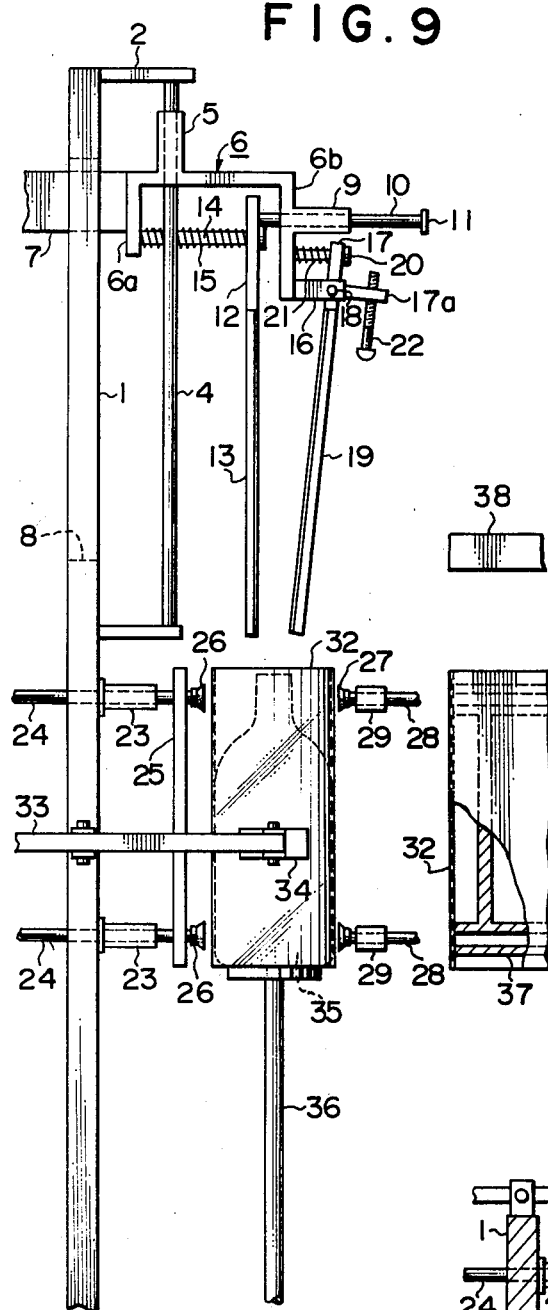
FIG. 9 is a side view of the machine of FIG. 1, wherein the opening members are pulled out of the sleeve seal fitted on the container.

The platform 6 is then raised and thus the rear and the front opening members 13 and 19 are pulled out of the sleeve seal 32 fitted over the bottle 35. The suction of the suction cups 26 and 27 are stopped and the suction cups are released from the bottle 35, as shown in FIG. 9. The pivot arms 33 with the holding members 34 are pivoted outwards away from the bottle 35. The bottle 35 fitted in the sleeve seal 32 is moved down by the lift means 36, and then the bottle 35 may be transferred to the next step, such as heat seal of a conventional one.

Figure 10:
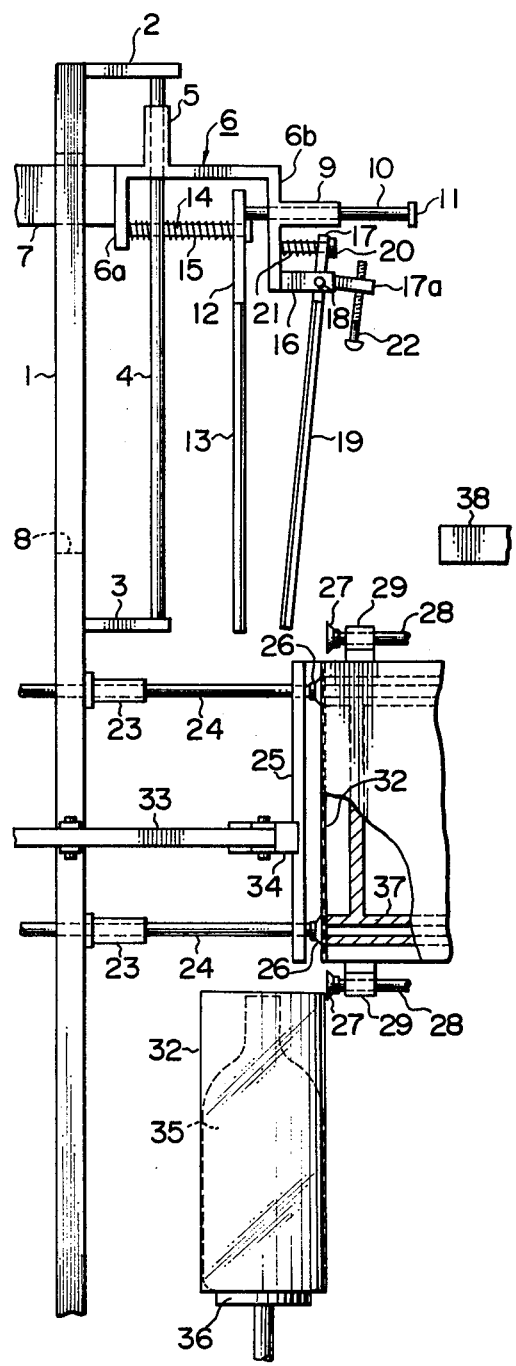
FIG. 10 is a side view of the machine of FIG. 1, wherein the container fitted in the sleeve seal is taken away and a next sleeve seal of a collapsed form is supplied.

The front suction cups 27 are pivoted outwards by pivoting the pivot shaft 30, and between the front suction cups pivoted the sleeve seal supply drum 37 is moved rearward with a next sleeve seal 32 on its surface. Then, the rear suction cups 26 are moved forwards to receive the next sleeve seal 32 from the sleeve seal supply drum 37, as shown in FIG. 10.

Then, the rear suction cups 26 holding the sleeve seal 32 are moved rearward and the sleeve seal supply drum 37 is moved forward to the normal position. The front suction cups 27 are pivoted inwards in contact with the sleeve seal 32 held by the rear suction cups 26, as shown in FIG. 1. The operation described above is repeated.

Although the present invention has been shown and described in terms of a preferred embodiment thereof in connection with the accompanying drawings, various changes and modifications could be made by those skilled in the art without departing from the scope of the present invention.

For instance, one of the opening members or the two opening members may be separated each other in order to open the sleeve seal fully. The opening members may be inserted from the bottom of the sleeve seal opened, and the bottle 35 may be inserted into the sleeve seal opened from the top. In these cases, the positioned of these parts concerned will be changed.

What is claimed is:

1. A method for fitting a sleeve seal over a container comprising the steps of:
    (a) supplying a sleeve seal in a flattened form between opposing suction holding cups, and actuating the suction holding cups to hold the sleeve seal;
    (b) moving the suction holding cups apart so as to partly open the sleeve seal;
    (c) inserting opening members into the partly opened sleeve seal;
    (d) moving the opening members apart to stretch the sleeve seal, in such a manner that in the direction of movement of the opening members the sleeve seal is stretched substantially larger than its final dimension when fitted over the container, and in the direction orthogonal both to the direction of movement of the opening members and to the axis of the sleeve seal it is stretched to substantially less than its final dimension when fitted over the container;
    (e) moving the opening members together so that the sleeve seal is relaxed and adopts a shape substantially similar to its required final shape when fitted over the container;
    (f) inserting the container into the sleeve seal;
    (g) simultaneously holding the sleeve seal in position on the container and extracting the opening members; and
    (h) wherein substantially throughout the stretching step (d) the suction holding cups are disengaged from the sleeve seal, and the suction holding cups are reengaged with the sleeve seal during step (e) so as to retain the sleeve seal in position as the container is inserted.

2. The method claimed in claim 1 wherein the opening members are engaged with portions of the sleeve seal intermediate between those portions which in the flattened state formed the edges, whereby during stretching step (d) the maximally stretched portions aligned parallel to the direction of motion of the opening members include those portions which in the flattened state formed the edges.

3. A machine for fitting a sleeve seal over a container comprising:
    (a) means for supplying a sleeve seal in a flattened form;
    (b) opposing suction holding cups selectively actuatable and cooperating with the supply means, adapted to hold a sleeve seal supplied in flattened form by the supply means, and means to selectively move the suction cups apart for opening the sleeve seal to a certain degree;
    (c) opening members adapted to be inserted into the sleeve seal partly opened by the suction holding means, and engage with portions of the sleeve seal intermediate between those portions which in the flattened form formed the edges, means for inserting said members into the sleeve, means for selectively moving said members apart to a separation substantially wider than the dimension, in the direction of movement of the opening members, of the sleeve seal when finally fitted on the container, and the opening members having a dimension in the direction orthogonal both to the direction of movement of the opening members and to the axis of the sleeve seal substantially less than the dimension in that direction of the sleeve seal in its form when finally fitted over the container, said members moving means including means to move the members toward each other so that the sleeve seal is relaxed and adopts a shape substantially similar to its required final shape when fitted over the container;
    (d) means for inserting a container into a sleeve seal held by said opening members; and
    (e) control means sequencing the operation of the supply means, suction holding means, opening members and inserting means, said control means deactivating said means to move the suction cups apart so that substantially throughout the stretching stop when said opening members move apart the suction cups are disengaged from the sleeve and reactivating said means to move the suction cups apart so that said suction cups are reengaged with the sleeve while the opening members are move toward each other so as to retain the sleeve seal in position as the container is inserted.

4. The machine as claimed in claim 3 wherein the suction cups comprise opposing suction holders each of which comprises at least two suction cups disposed substantially along the axis of the sleeve seal.

* * * * *